United States Patent
Hirst et al.

(10) Patent No.: US 9,383,039 B2
(45) Date of Patent: Jul. 5, 2016

(54) PIPE BRACE

(71) Applicant: AES Engineering Ltd., Mill Close (GB)

(72) Inventors: Simon Hirst, Holmes Chapel (GB); Neil Parkinson, Stockport (GB)

(73) Assignee: AES Engineering Ltd., Mill Close, Rotherham (GB)

( * ) Notice: Subject to any disclaimer, the term of this patent is extended or adjusted under 35 U.S.C. 154(b) by 0 days.

(21) Appl. No.: 14/335,253

(22) Filed: Jul. 18, 2014

(65) Prior Publication Data

US 2015/0021447 A1    Jan. 22, 2015

(51) Int. Cl.
| | | |
|---|---|---|
| *F16L 3/08* | (2006.01) | |
| *F16L 3/015* | (2006.01) | |
| *F16L 55/033* | (2006.01) | |
| *F16L 55/04* | (2006.01) | |
| *F16L 55/045* | (2006.01) | |
| *F16L 3/10* | (2006.01) | |
| *F16L 3/12* | (2006.01) | |

(Continued)

(52) U.S. Cl.
CPC ............... *F16L 3/085* (2013.01); *F16F 15/02* (2013.01); *F16L 3/015* (2013.01); *F16L 3/08* (2013.01); *F16L 3/1091* (2013.01); *F16L 3/127* (2013.01); *F16L 3/1207* (2013.01); *F16L 3/16* (2013.01); *F16L 3/18* (2013.01); *F16L 3/20* (2013.01); *F16L 3/237* (2013.01); *F16L 55/033* (2013.01); *F16L 55/035* (2013.01); *F16L 55/0335* (2013.01); *F16L 55/04* (2013.01); *F16L 55/041* (2013.01); *F16L 55/043* (2013.01); *F16L 55/045* (2013.01); *H02G 7/14* (2013.01)

(58) Field of Classification Search
CPC ....... F16L 55/035; F16L 55/033; F16L 55/04; F16L 55/0335; F16L 55/041; F16L 55/043; F16L 55/045; F16L 3/08; F16L 3/085; F16L 3/1091; F16L 3/1207; F16L 3/16; F16L 3/015; F16L 3/127; F16F 15/02; H02G 7/14
See application file for complete search history.

(56) References Cited

U.S. PATENT DOCUMENTS

| | | | | | |
|---|---|---|---|---|---|
| 1,639,820 | A | * | 8/1927 | Varney | ............................ 174/42 |
| 3,128,330 | A | * | 4/1964 | Grasser | ........................... 174/42 |

(Continued)

FOREIGN PATENT DOCUMENTS

| | | | | |
|---|---|---|---|---|
| CH | 493777 | A | * | 7/1970 |
| DE | 4123390 | A1 | * | 1/1993 |

(Continued)

OTHER PUBLICATIONS

UK Search Report dated Jan. 15, 2014 for corresponding application No. GB1312900.2.

*Primary Examiner* — Terrell McKinnon
*Assistant Examiner* — Eret McNichols
(74) *Attorney, Agent, or Firm* — Quine Intellectual Property Law Group, P.C.

(57) ABSTRACT

A pipework brace comprising a first pipework engaging member and a second engaging member. A first tubular strut and a second tubular strut are provided and the first tubular strut is attached to the first and second engaging members by connectors located at each end of the first tubular strut. The second tubular strut is connected to the first and second engaging members by connectors located at each end of the second tubular strut. The connectors each comprise two clamp members that are arranged to allow multi-axis rotation so that each end of the strut may be moved in at least two planes relative to the pipe work engaging members.

15 Claims, 5 Drawing Sheets

(51) Int. Cl.
*F16L 3/16* (2006.01)
*F16L 3/127* (2006.01)
*F16F 15/02* (2006.01)
*H02G 7/14* (2006.01)
*F16L 3/18* (2006.01)
*F16L 3/20* (2006.01)
*F16L 3/237* (2006.01)
*F16L 55/035* (2006.01)

(56) References Cited

U.S. PATENT DOCUMENTS

| | | | | |
|---|---|---|---|---|
| 4,852,848 A | * | 8/1989 | Kucera | 248/559 |
| 4,995,583 A | * | 2/1991 | De La Fuente | 248/636 |
| 5,131,611 A | * | 7/1992 | Vollaro | 244/173.1 |
| 5,348,124 A | * | 9/1994 | Harper | 188/378 |
| 8,215,607 B2 | * | 7/2012 | Wang et al. | 248/636 |
| 8,490,916 B2 | * | 7/2013 | Olsen et al. | 244/54 |
| 9,021,644 B2 | * | 5/2015 | Kawabata et al. | 14/77.1 |
| 2008/0258461 A1 | | 10/2008 | Heath | |
| 2011/0147538 A1 | * | 6/2011 | Schiefelbein, Jr. | 248/60 |
| 2015/0158034 A1 | * | 6/2015 | Tammera | 55/346 |

FOREIGN PATENT DOCUMENTS

| | | | | |
|---|---|---|---|---|
| DE | 4135120 A1 | * | 4/1993 | H02G 7/14 |
| DE | 19946222 C1 | * | 4/2001 | F16L 3/11 |
| FR | 2415771 A1 | * | 8/1979 | |
| FR | 2728538 A1 | * | 6/1996 | |
| GB | 565186 A | | 10/1944 | |
| GB | 581183 A | | 10/1946 | |
| GB | 2354036 A | | 3/2001 | |
| GB | 2520837 A | * | 6/2015 | |
| WO | WO 2008/073398 A1 | | 6/2008 | |

* cited by examiner

PIPE BRACE

RELATED APPLICATIONS

This application claims benefit and priority to UK patent application A Pipe Brace, GB 1312900.2, filed Jul. 18, 2013, which is incorporated herein for all purposes.

FIELD OF THE INVENTION

This invention relates to a pipe brace, particularly for use in reducing pipe vibrations.

BACKGROUND TO THE INVENTION

Vibration induced fatigue failure is a major cause of pipework failure, in particular welded connections between small bore connections (SBCs), typically 0.5" to 2" diameter, and Main Lines, typically >2".

The likelihood of failure increases if the main line pipe experiences operational vibration or transient vibration events or if the frequency of vibration of the SBC matches any of the operational frequencies. The likelihood of failure is highest in the case of large unsupported valves on small diameter SBCs which are excessively long.

The most common retro-fit solution to such problems is to fit substantial bracing in accordance with the good practice methods detailed in the Energy Institute Guidelines. This requires the SBC to be braced back to the parent pipe with supports which have suitably high stiffness to provide effective support against movement in all 3 planes. In many cases, operators fit braces which are ineffective and so not satisfy the EI Guidelines.

One of the main problems in accurately designing a retrofit brace of sufficient stiffness is in obtaining sufficiently accurate dimensions for often complex compound pipe geometries to enable the brace to be designed and fabricated offsite. Consequently, it is common for such braces to be of poor fit which can result in incorrect and ineffective installation or else can impart high static stresses in the SBC in forcing it to fit the brace.

SUMMARY OF THE INVENTION

Accordingly, the present invention is directed to a pipework brace comprising:
a first pipework engaging member;
a second engaging member; and
a first tubular strut and a second tubular strut,
wherein the first tubular strut is attached to the first pipework engaging member and the second engaging member by connectors located at each end of the first tubular strut and the second tubular strut is connected to the first pipework engaging member and the second engaging member by connectors located at each end of the second tubular strut, and wherein the connectors each comprise two clamp members that are arranged to allow multi-axis rotation so that each end of the strut may be moved in at least two rotational planes relative to the pipe work engaging member and the second engaging member.

The use of tubular struts, which preferably comprise a circular cross-section, allows for the clamp members to be rotated around to allow connection in any orientation. This provides flexibility to the pipe brace system and allows the brace to be connected between two pipe that are at any angle, without inducing undue stress on the arrangement.

The connectors at opposite ends of each strut can be rotated about the axis of the strut at any angle relative to each other, thereby providing flexibility in the positioning and installation of the pipe brace.

The present invention is intended to allow connection between two pipes or other fittings at any linear or angular configuration. This is due to the linear length and angular versatility of the present invention, thereby permitting a wide range of movements in all degrees of freedom.

In a preferred embodiment, the second engaging member is a pipework engaging member. This allows two pipes to be connected to one another and brace one another. Alternatively, the second engaging member may be connected to a structural element, such as a wall or ceiling, or another element, for example a solid structure or item of machinery.

Advantageously, a third strut 13 is provided between the first and second struts and connected thereto by way of connectors comprising clamp members. Providing a third strut to connect the first and second struts provides a more secure fixing. By using clamp connectors to attach this third strut to the first and second struts allows it to be affixed at any suitable position along the length of the first and second struts.

Preferably, the, or at least one, strut is provided with adjustment means to adjust its length. This allows for the brace to be adjustable to fit particular applications.

In an advantageous construction, the, or at least one of the, pipework engaging members comprises a split clamp. This allows the pipework engaging members to be fitted to preinstalled pipe in a simple fashion.

It is preferable that, at least one of the connectors provides a pivoting connection between the pipework engaging member and the strut.

Advantageously, the connector comprises at least one hinge joint, and more advantageously, the axes of the hinge joints are substantially orthogonal. This increases the flexibility of the system by allowing for rotation of the clamp members about an axis, thereby allowing connection in a plurality of positions.

Preferably, the, or at least one, pipework engaging member comprises an integral boss and the respective connector is provided with a body portion comprising a plurality of boss-receiving recesses and a hinge connector, such that the orientation of the hinge connector can be adjusted according to which of the boss-receiving recesses the boss is to be received within.

More preferably, the boss-receiving recesses are substantially orthogonal to one another.

The invention extends to a kit comprising the parts of the pipe brace and a method of installing a pipe brace in according with the present invention.

The present invention thus comprises a bolted clamping mechanism at each end for attachment onto pipework, pipework components or nearby structures and connected together using at least two struts. The connection points between the struts and the pipe clamps incorporate a fitting which has multiple degrees of freedom to permit alignment of all components for all pipework geometrical configurations. An optional additional cross-strut between the 2 struts provides additional rigidity and comprises the same standard parts.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
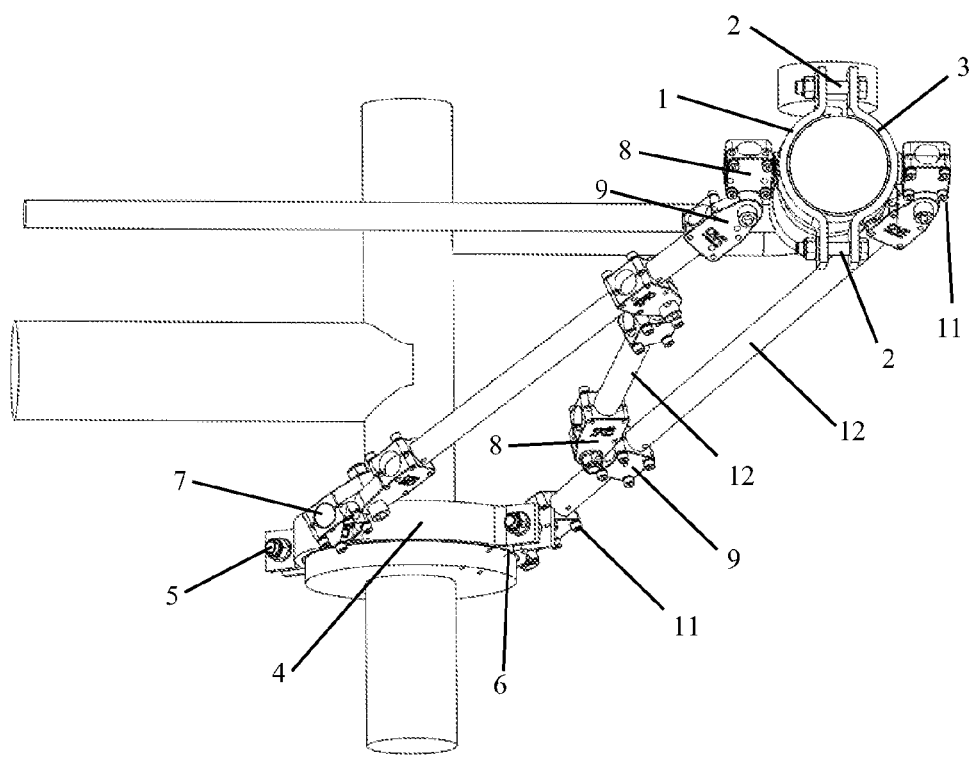
FIG. 1 is a diagram showing a pipe brace arrangement in accordance with the present invention.

The figures show a pipe brace system comprising a split clamp 1 connected to a small diameter pipe, which may be typically attached around the flange of a valve on the small bore connection representing the dominant mass. The split clamp 1 is held in place on the small diameter pipe using a threaded fastener 2, which can be rotated to tighten its grip on the pipe. A wear resistant liner 3 is provided on for the split clamp 1.

On a large diameter pipe, a second split clamp 4 is provided, typically positioned on the main line pipe to create an angle of 45°±15° between the brace and the main line pipe. Again, the pipe clamp 4 is provided with threaded fasteners 5 to hold the clamp 4 in place and a wear resistant liner 6 is provided for the main line split clamp 4.

The split clamps 1 and 4 are provided with mounting bosses 7, which may be integral or welded thereto. The split clamps are shown with two bosses 7 on each clamp 1 and 4, although any number may be provided.

The split clamps 1 and 4 are connected on opposite sides by struts 12. The struts 12 are substantially rigid to rigidly connect the two pipes. The struts 12 are connected to the split clamps 1 and 4 by way of connectors that comprise split clamps 8, which are clamped onto the bosses 7 of the split clamps 1 and 4 on a pivot side 8, and a clamp side 9. The two parts of the clamps 8 and 9 comprises a first part 8, which connects to the boss 7 by threaded fasteners 11 and the connector allows rotation thereabout, and the second part 9 is connected to the first part 8 by a pivot, or hinge, mechanism. This allows rotation about the axis of the pivot. The clamps 8 and 9 then attach to the strut 12 by clamping thereto using the second part 9. The strut can rotate within the clamping aperture of the clamp 9. This allows the connections to provide adjustable pitch, roll and yaw, thus allowing the brace to be positioned in almost any position, thereby making it suitable for all pipe bracing applications.

Figure 2:
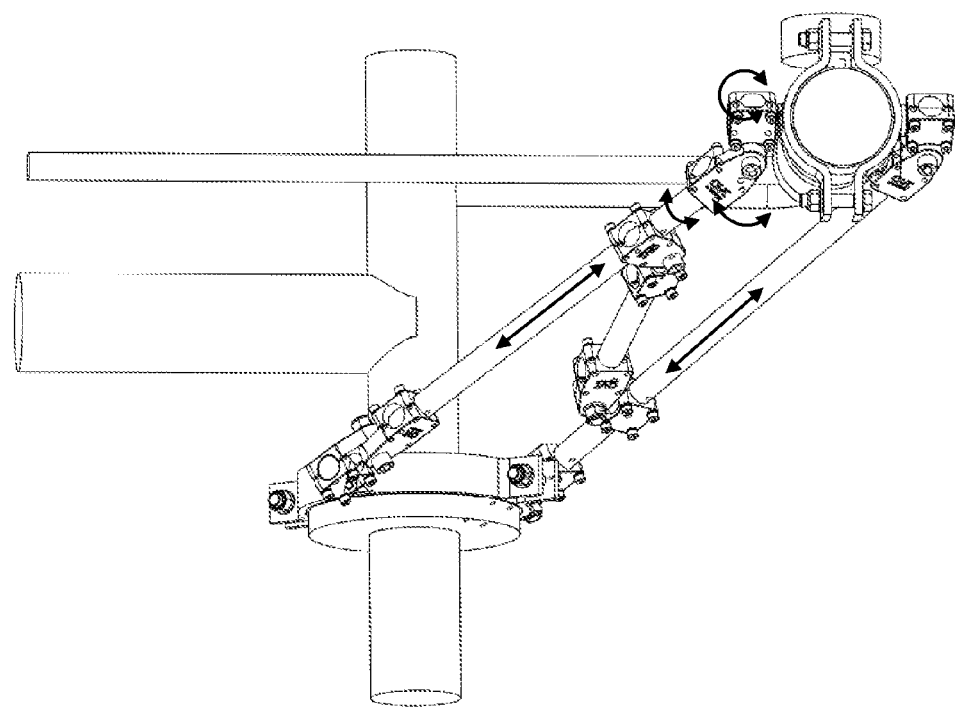
FIG. 2 is a diagram showing the arrangement of FIG. 1 highlighting the available movement possible.

FIG. 2 shows the angular rotation in all planes about the clamps and the pipes. The struts 12 may be cut to length or may be length adjustable. The split clamps 1 and 4 may be of a diameter to suit all standard pipe sizes.

Figure 3:
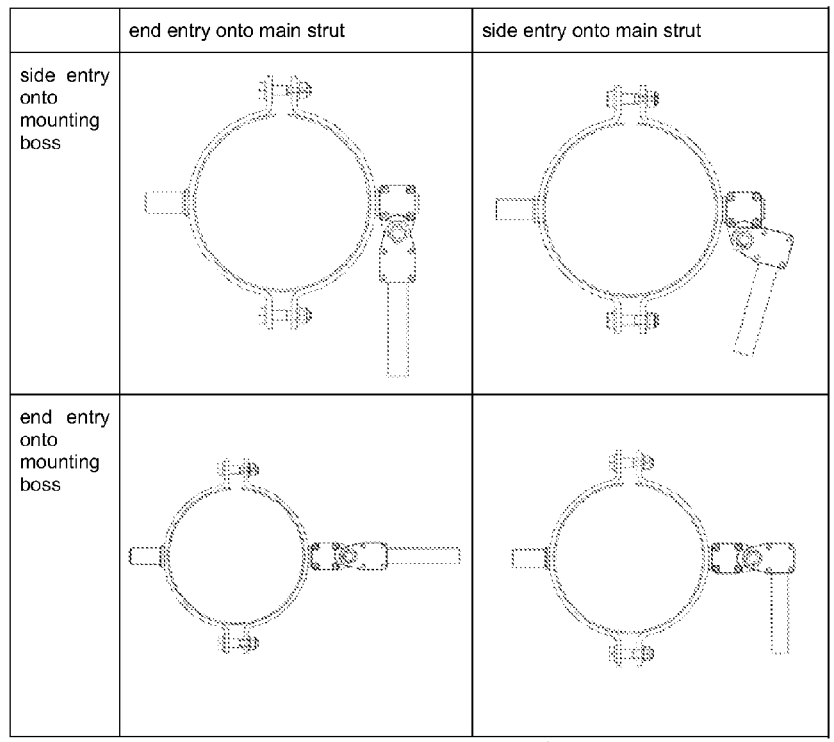
FIG. 3 is a table showing angular configurations of the split clamps and connectors of the embodiment of FIG. 1.

As shown in FIG. 3, the present invention can be used in four configurations modes to provide a wide versatility of angular configurations.

Figure 4:
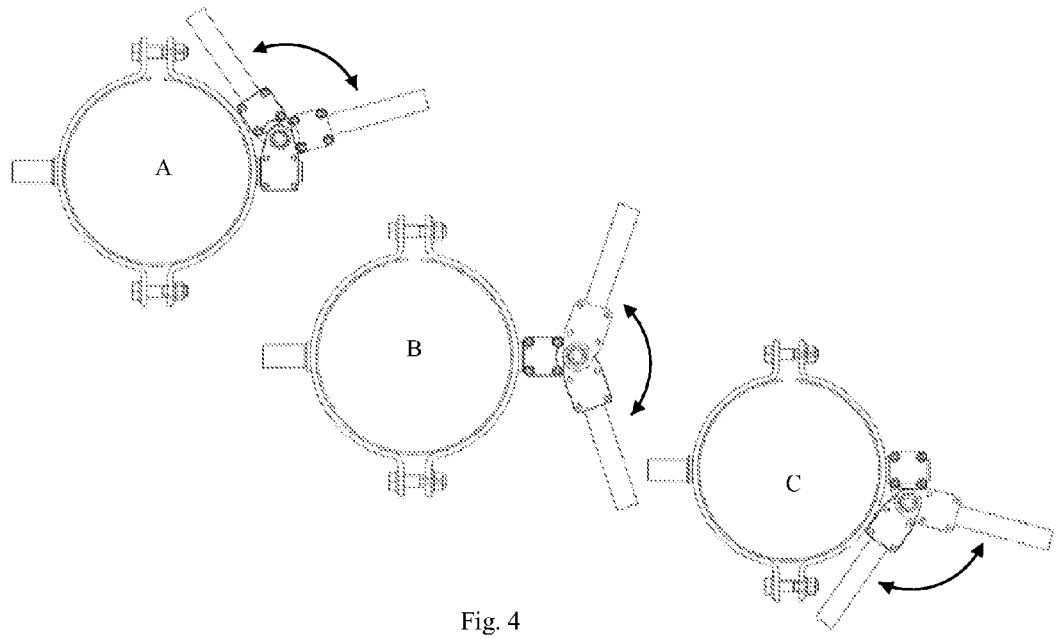
FIG. 4 shows angular movement of parts of the embodiment of FIG. 1.

FIG. 4 shows the ranges of angular movement available in the device of the present invention. More than 180° of angular movement of the main struts about the split clamp pivot axis is available.

Figure 5:
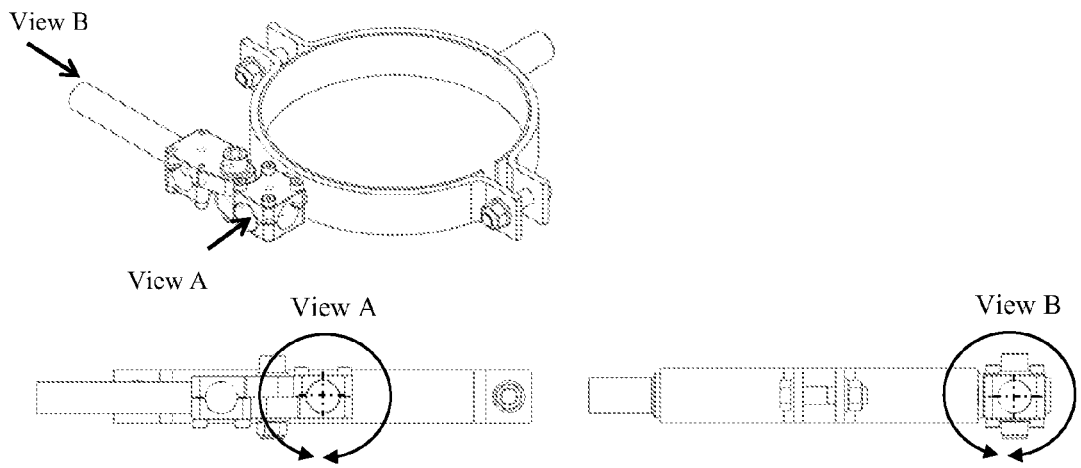
FIG. 5 shows a further view of the pipework engaging split clamp of FIG. 1.
Figure 6:
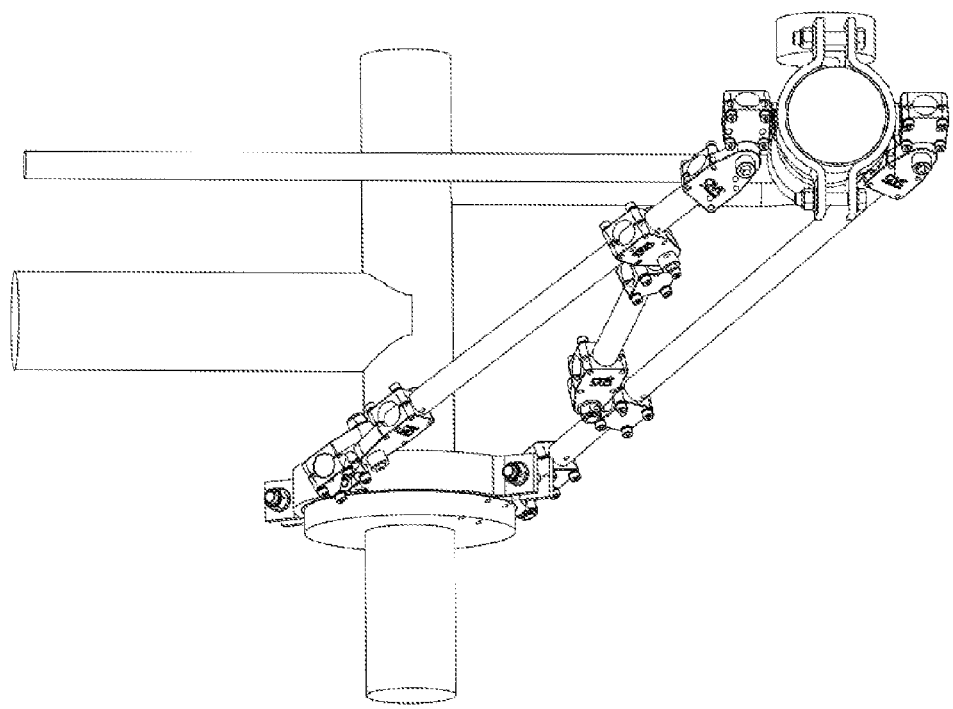
FIG. 6 shows a further arrangement of a pipe brace in accordance with the present invention.
Figure 7:
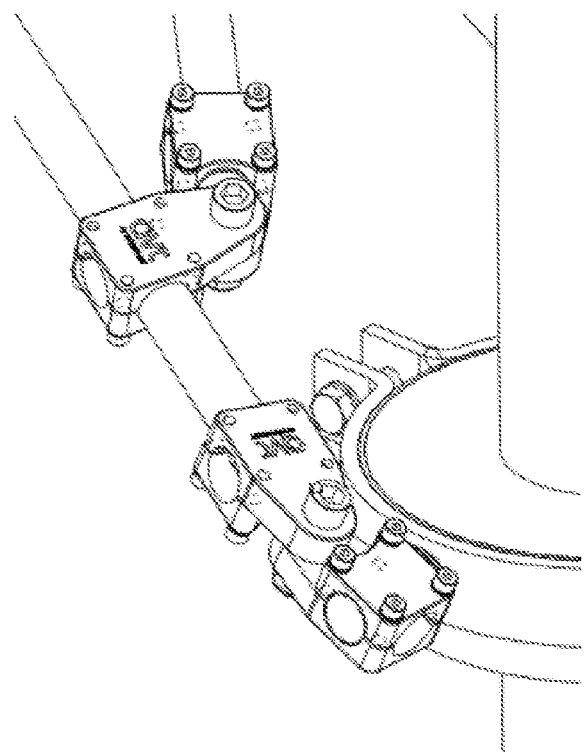
FIG. 7 shows an enlarged view of part of a pipe brace in accordance with the present invention.
Figure 8:
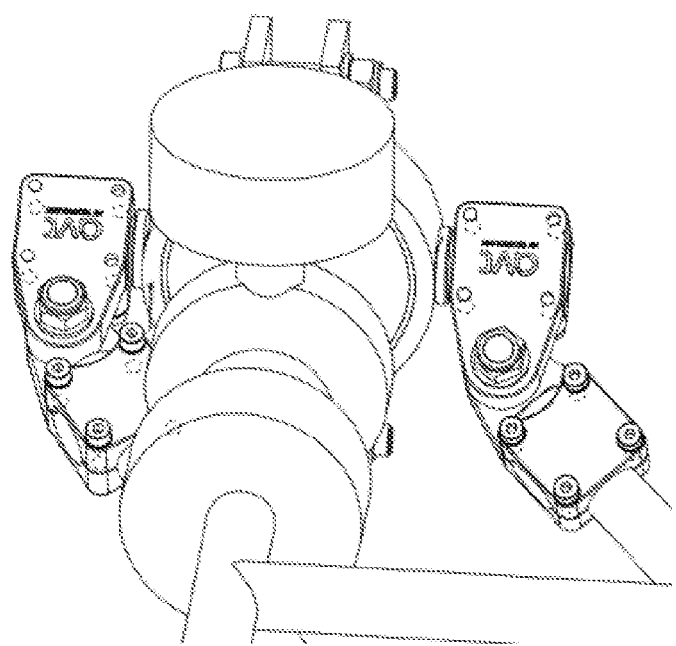
FIGS. 8 to 10 show further embodiments of the present invention.
Figure 9:
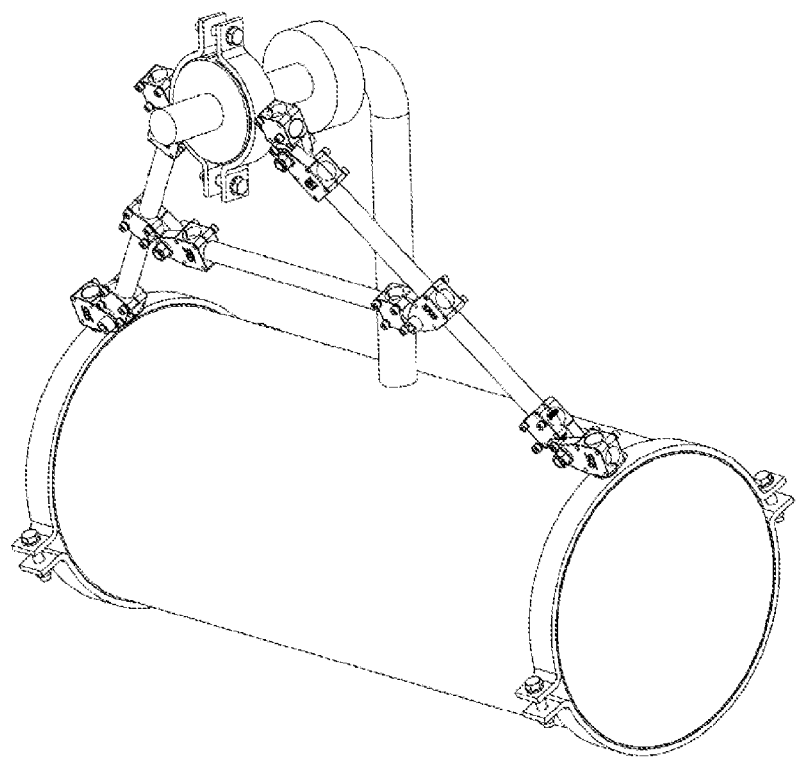
Figure 10:
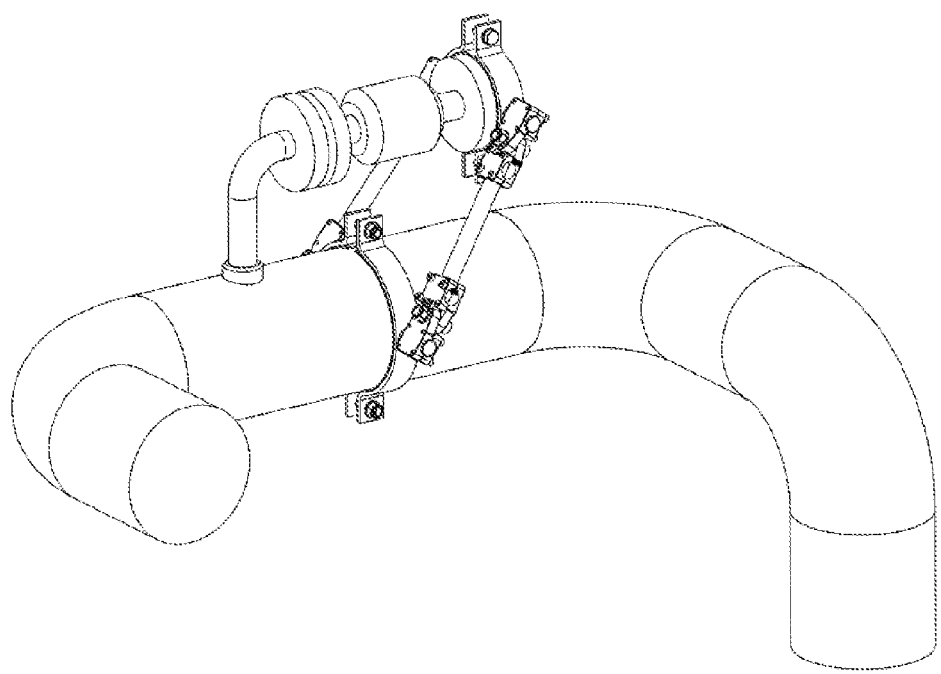

FIG. 5 shows how the present invention allows for 360° rotation of the connectors about the mounting boss 7.

FIGS. 6 to 10 show further embodiments of the present invention.

In the embodiment of FIG. 1, the present invention rigidly ties the SBC to the main-line pipework. When fitted, together with the SBC brace and the parent pipe, the present invention forms triangular two or three legged truss structural arrangement to provide structural support in all planes in order to clamp the SBC to the main line. This reduces differential movement between the two pipeline components and thereby reduces dynamic stresses at the intersection between the SBC and the Main Line pipe.

The connectors may be dual-axis connectors or they may be one or more single axis connectors.

The diameter of each boss is substantially the same diameter as the struts extending between the engaging members or split clamps. This allows the connectors to be of a uniform size that can connected to any of the bosses.

The pipe brace may comprise further struts to provide additional support. Some of those further struts may not necessarily be connected to the first and second connector but may be connected to further structures or objects to provide additional stability.

The present invention can be used in a number of variant configurations. For example, the pipe engaging split clamps 1 and 4 at either end of the struts could be replaced with an equivalent fixing for attachment onto any other pipework component, for example, a flange, a valve or a regulator, or a fixing designed for attachment to a steel or concrete structure. In this case, the alternative fixings would incorporate the same mounting bosses 7.

The present invention may be used in both offshore and onshore industries. More particularly, the present invention comprises a universal bracing system to be used to provide static and dynamic support to pipework to reduce the risk of vibration induced fatigue failure.

The present invention is scalable such that the invention can be used to support pipes of a variety of different sizes and including the support of main line pipes, small bore connections, instrument tubes and other pipework components such as valves, regulators, pressure gauges and similar.

The present invention is particularly relevant to the bracing of Small Bore Connections (SBC), where the invention provides bracing support in accordance with the requirements of the Energy Institute publication: 'Guidelines for the avoidance of vibration induced fatigue failure in process pipework', 2nd edition. Hereinafter referred to as the EI Guidelines.

The part provided as part of the present invention can be supplied to fit any size of pipe or pipe-fitting and the parts required to put the present invention into effect comprise interchangeable component parts.

The pipe brace of the present invention may be on-site adjustable to fit all sizes of pipework by changing split clamp sizes and adjusting or cutting the length of the struts to suit.

The present invention bracing system is intended to incorporate a triangular truss arrangement, offering high stiffness in all planes in order to offer effective pipe support.

Normally, the axis of the pipe will provide support in one of the three planes of movement and so a brace with two struts will normally be required, however, if required, a second brace support can be fitted.

The present invention incorporates both angular and linear dimensional adjustability in all required dimensions to fit any pipe configuration.

For a SBC application, only 3 dimensions are required in order to prepare the brace: the diameter of each of the 2 split-clamp locations and the approximate length between them.

The parts of the pipe brace may be connected using bolted connections and thus no on-site welding is required to assemble or install the pipe brace. This allows the pipe brace to be installed by non-specialist fitters.

The present invention allows for a wide range of angular adjustment on-site to suit any as-built geometry, as shown in the figures.

The contents of the priority application, GB1312900.2 are hereby incorporated by reference.

The invention claimed is:

1. A pipework brace comprising:
a first pipework engaging member;
a second engaging member; and
a first strut and a second strut,
wherein the first strut is attached to the first pipework engaging member and the second engaging member by first strut connectors located at each end of the first strut, and the second strut is connected to the first pipework engaging member and the second engaging member by second strut connectors located at each end of the second strut, and
wherein a first of the first strut connectors comprises two clamp members, wherein the first strut is received into a first strut clamping aperture of a first of the two clamp members thereby allowing rotation of the first strut in the first strut clamping aperture, and
wherein a boss of the first pipework engaging member is received into a second of the two clamp members thereby allowing rotation of the second of the two clamp members on the boss, whereby the first strut can be moved in at least two rotational planes relative to the first pipework engaging member.

2. A pipework brace according to claim 1, wherein the second engaging member is a pipework engaging member.

3. A pipework brace according to claim 1, wherein a third strut is provided between the first and second struts and connected thereto by way of connectors comprising clamp members.

4. A pipework brace according to claim 1, wherein the first or second strut is adjustable in length.

5. A pipework brace according to claim 1, wherein at least one of the engaging members comprises a split clamp.

6. A pipework brace according to claim 1, wherein at least one of the first strut connectors provides a pivoting connection between the first and second of the two clamp members.

7. A pipework brace according to claim 6, wherein the at least one of the first strut connectors comprises at least one hinge joint.

8. A pipework brace according to claim 1, wherein a first connector at a first end of the first strut comprises a first hinge joint comprising a first axis, and a second connector at a second end of the first strut comprises a second hinge joint comprising a second axis, wherein the first and second axes of the hinge joints are substantially orthogonal.

9. A pipework brace according to claim 1, wherein at least one engaging member comprises an integral boss and the respective strut connector is provided with a body portion comprising a plurality of boss-receiving recesses and a hinge connector, whereby the orientation of the hinge connector can be adjusted according to which of the boss-receiving recesses the boss is to be received within.

10. A pipework brace according to claim 9, wherein the boss-receiving recesses are substantially orthogonal to one another.

11. The pipework brace of claim 1, wherein the first or second strut is a tubular strut.

12. The pipework brace of claim 1, wherein the first strut connectors at each end of the first strut each comprise two connector clamp members.

13. The pipework brace of claim 1, wherein a second of the first strut connectors comprises two second connector clamp members, wherein the first strut is received into a clamping aperture of a first of the two second connector clamp members allowing rotation of the first strut in the first of the two second connector clamp members, and a second of the two second connector clamp members is arranged to receive a boss of the second engaging member allowing rotation of the second of the two second connector clamp member on the boss.

14. The pipework brace of claim 1, wherein the second strut is attached to the first pipework engaging member and the second engaging member by second strut connectors located at each end of the second strut.

15. The pipework brace of claim 14, wherein the second strut is connected to the first pipework engaging member and the second engaging member by the second strut connectors located at each end of the second strut, wherein the second strut is received into a clamping aperture of a first of the two second strut connectors, thereby allowing rotation of the second strut in the clamping aperture of the first of the two second strut connectors.

* * * * *